United States Patent [19]

Nagel

[11] Patent Number: 5,502,511
[45] Date of Patent: Mar. 26, 1996

[54] METHOD AND APPARATUS FOR CONTROLLING EXPANDED SWEEPS

[75] Inventor: Scott Nagel, Sioux Falls, S. Dak.

[73] Assignee: Sencore, Inc., Sioux Falls, S. Dak.

[21] Appl. No.: 349,187

[22] Filed: Dec. 5, 1994

[51] Int. Cl.⁶ .................................................. H04N 3/223
[52] U.S. Cl. ........................ 348/704; 348/511; 348/184
[58] Field of Search ........................................ 348/704, 184, 348/185, 511, 546, 548; H04N 3/223, 3/227

[56] References Cited

U.S. PATENT DOCUMENTS

| | | | |
|---|---|---|---|
| 4,227,215 | 10/1980 | Gurley et al. | 348/511 |
| 4,739,403 | 4/1988 | Mark | 348/511 |
| 5,347,317 | 9/1994 | Sakurai | 348/511 |

FOREIGN PATENT DOCUMENTS

| | | | |
|---|---|---|---|
| 0468668 | 3/1992 | Japan | H04N 3/223 |

Primary Examiner—James J. Groody
Assistant Examiner—Jeffrey S. Murrell
Attorney, Agent, or Firm—Patnaude, Videbeck, Marsh

[57] ABSTRACT

A method and apparatus provides sweep control signals for an expanded display of a selected portion of a television signal. A first counter is preloaded with a number related to the position of the left hand edge of the selected portion of the waveform being monitored and a second counter is preloaded with a number related to the position of the right hand edge of the selected portion of the waveform. Clock pulses are counted by the first counter until the number preloaded therein is reached and then the second counter counts the clock pulses until the number preloaded therein is reached. Control signals are developed when each of the counters has counted the number preloaded therein.

7 Claims, 2 Drawing Sheets

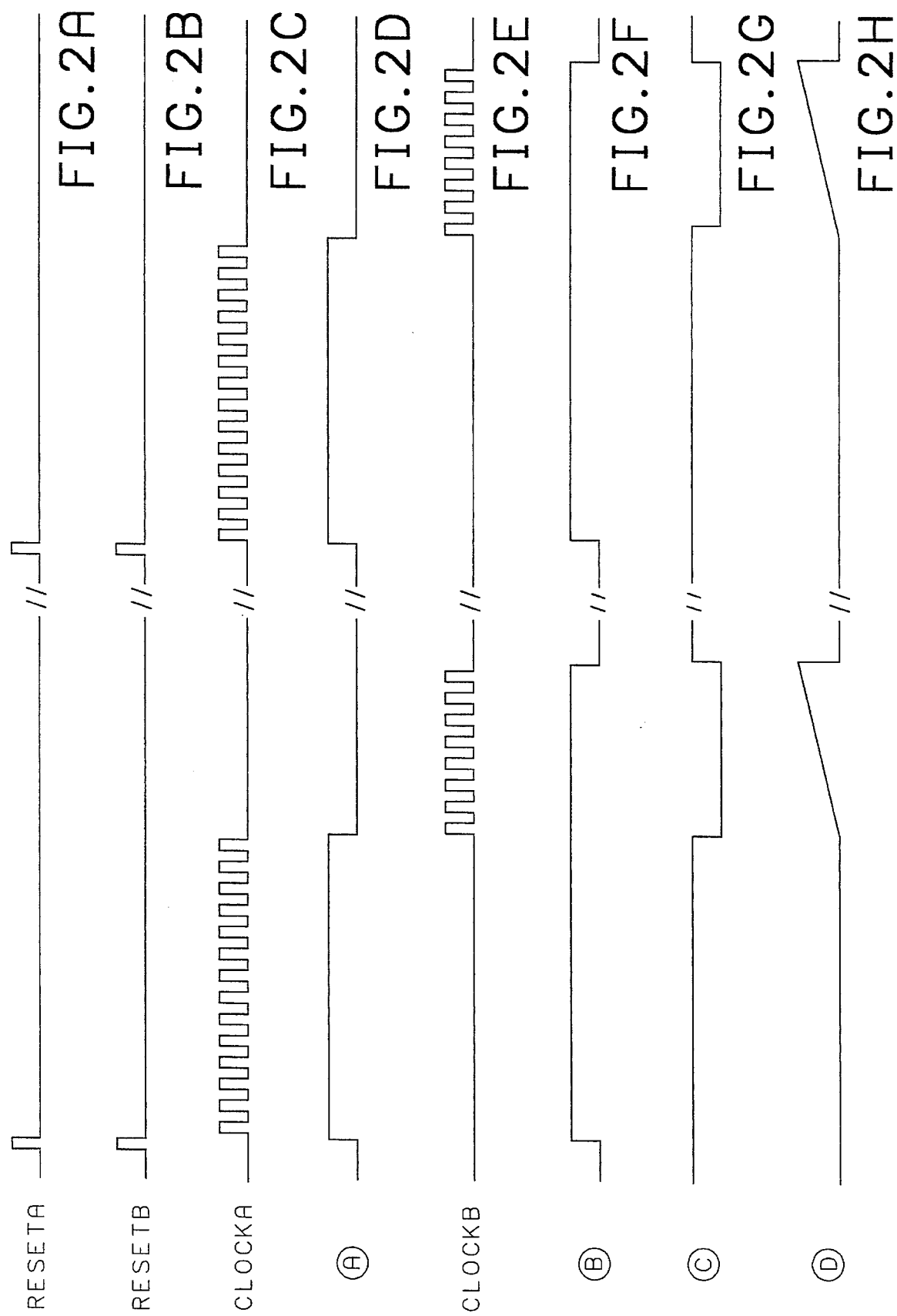

METHOD AND APPARATUS FOR CONTROLLING EXPANDED SWEEPS

The present invention relates in general to methods and apparatus for controlling sweep waveforms in cathode ray tubes and in video waveform monitors, and it relates more particularly to a new and improved method and apparatus which is useful for controlling expanded sweeps in waveform monitors.

BACKGROUND OF THE INVENTION

High quality waveform monitors are commonly used for viewing and analyzing television signals, and they generally permit the user to view expanded portions of the television signal being monitored on the displays of the associated video waveform monitors. This enables the user to observe in great detail any part of the waveform being analyzed.

Present day waveform monitors use the horizontal position control of the instrument to select the portion of the waveform to be displayed. However, for several reasons the use of the horizontal position control for this purpose can be confusing. First of all, when using the horizontal position control to select the portion of the waveform to be displayed in expanded form, the user must know and remember the location of the selected portion of the waveform with respect to time. Secondly, the user must be able to recognize the selected portion of the waveform in the expanded format when he sees it, which often necessitates switching back and forth between the expanded and non-expanded sweeps. Consequently, it would be desirable to provide an improved method and apparatus which would avoid the necessity of switching back and forth between the expanded and non-expanded sweeps when selecting a particular portion of a waveform to be observed on the screen of the monitor and thus facilitate the use of the expanded sweep feature of the analyzer.

SUMMARY OF THE INVENTION

Briefly, there is provided in accordance with the teachings of the present invention a novel method and apparatus for controlling expanded sweeps in a waveform monitor whereby when selecting a portion of the waveform to be displayed in expanded form, the user simply moves an intensified marker across the display of the non-expanded waveform to identify the portion of interest and then actuates a switch to instantly display on the screen of the monitor the selected portion of the waveform in expanded form. The need for the user to search the entire sweep width of the waveform is thus obviated.

In a preferred embodiment of the invention, the selected portion of the non-expanded display of the waveform being viewed is highlighted during selection of the portion of the waveform to be displayed in expanded form, thereby facilitating the selection process for the user. When the expanded sweep is subsequently produced, only the previously highlighted portion of the waveform is displayed in expanded form.

Also, in the preferred embodiment a plurality of sweep modes are provided to enable the user better to observe a particular portion of the composite television signal being analyzed.

GENERAL DESCRIPTION OF THE DRAWINGS

A more complete and better understanding of the present invention will be had from a reading of the following detailed description of a preferred embodiment of the invention taken in conjunction with the accompanying drawings wherein:

FIG. 1 is block diagram of an expanded sweep control system embodying the present invention; and FIGS. 2A through 2H are graphical illustrations of the waveforms of control signals used in the system of FIG. 1, FIGS. 2A through 2H taken together constituting a timing diagram.

DETAILED DESCRIPTION OF A PREFERRED EMBODIMENT OF THE INVENTION

Figure 1:
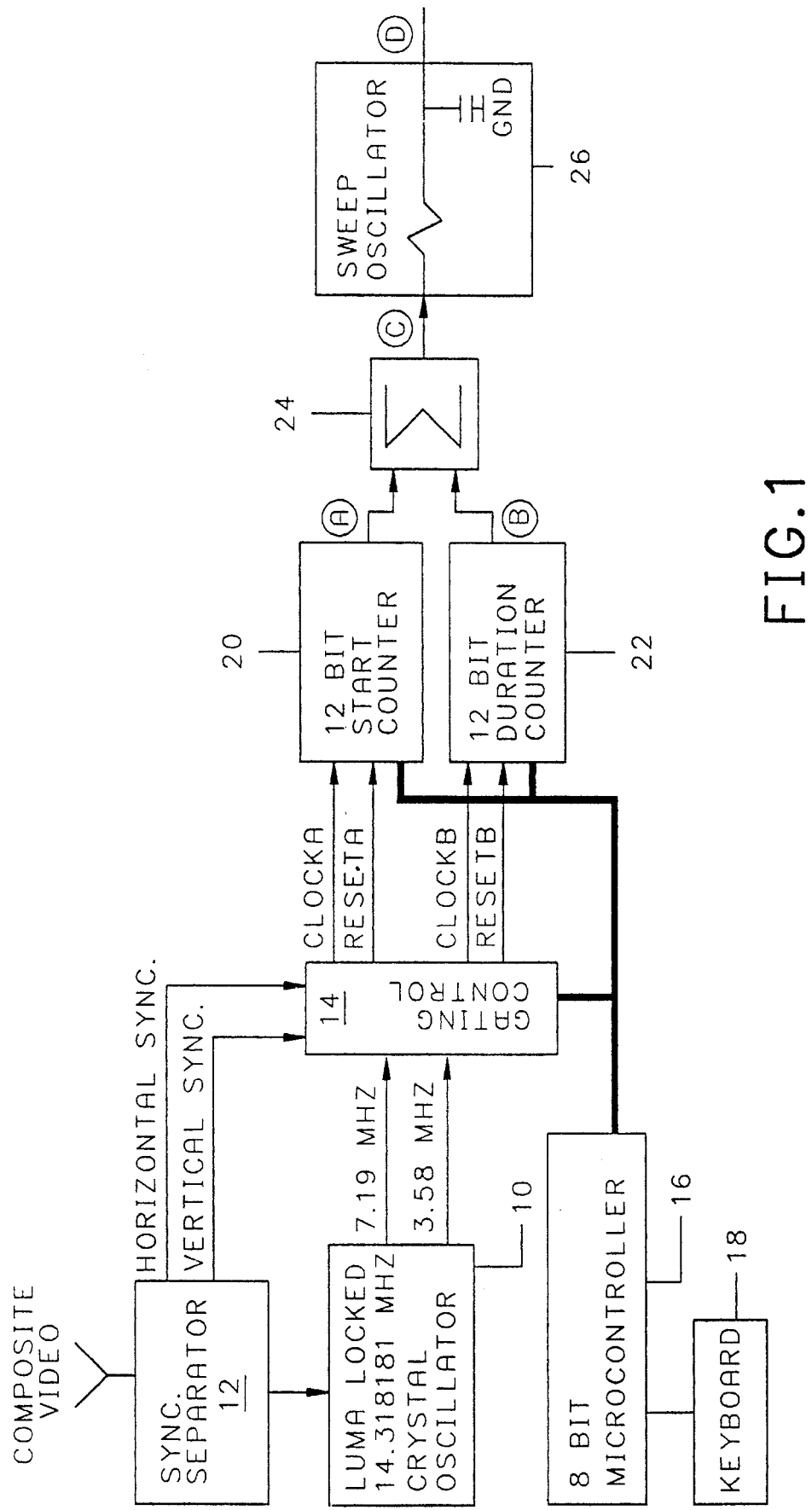

Referring to the drawings and particularly to FIG. 1, there is shown a block diagram of a circuit which controls the operation of a sweep signal oscillator which in turn controls the horizontal sweep of the display of a waveform monitor (not shown).

The circuit comprises a Luma Locked crystal controlled oscillator 10 having a fixed frequency of oscillation of 14.318181 Mhz and respective output signals at frequencies of 7.19 Mhz and 3.58 Mhz respectively. A vertical sync signal having a frequency of 60 Hz and a horizontal sync signal having a frequency of 157345 Hz are coupled from a sync separator 12 and applied to a gating control device or switch 14 to initiate the expanded sweep and to the oscillator 10 to control its frequency. The output from an eight bit microcontroller 16 which is controlled by a manual keyboard 18 is also applied to the gating control device 14 and may be used to select one of four possible sweep modes to facilitate observation of any portion of the video signal being analyzed.

There are four output signals from the gating control device 14 respectively termed a clock A signal, a reset A signal, a clock B signal, and a reset B signal. The clock A signal output and the reset A signal output are applied to the inputs of a 12 bit start counter 20, and the clock B signal output and the reset B signal output are applied to the inputs of a 12 bit duration counter 22. The output signal from the 8 bit microcontroller 16 is also applied to both of the counters 20 and 22.

The output signals from the counters 20 and 22 are referred to herein as A and B signals respectively and are applied to respective inputs of a summer device 24 to produce a composite signal C which is the exclusive or function of the A and B signals. The output signal C from the summer device 24 is applied to a sweep signal oscillator 26 which provides at its output a sawtooth waveform which drives the horizontal sweep for the display of the associated waveform monitor.

Operation

In operation, the horizontal sync pulses of the television signal waveform being analyzed are used to phase lock the oscillator 10 at the frequency of 14.31818 Mhz, nine hundred ten times the horizontal sync rate. The operator logs into the microcontroller 16 via the keyboard 18 the desired expansion of the sweep, and depending on the sweep mode selected, the clock pulses at frequencies of either 7.19 Mhz, one-half of the oscillator frequency, or 3.18 Mhz, one quarter the oscillator frequency, are applied to the gating control 14 for subsequent gating to the counters 20 and 22 as described hereinafter.

The gating control circuit 14 is controlled by the microcontroller 16 and the horizontal and vertical sync pulses from the sync separator 12 and gates either the 7.19 Mhz clock pulses or the 3.58 Mhz clock pulses and reset pulses at one or the other of those frequencies to the respective inputs of the counters 20 and 22 depending upon which of the expanded sweep modes is selected by the operator via the keyboard 18.

Assuming the operator has selected the sweep mode corresponding to the 7.19 Mhz rate, the 7.19 Mhz clock pulses are controlably gated through the gating control device 14 to the counters 20 and 22. In one sweep mode, each horizontal sync pulse from the sync separator 12 gates one clock pulse to the 12 bit counter 20. This pulse is termed a reset A pulse and is shown in FIG. 2A. It will be seen that a reset A pulse is generated for each horizontal sync pulse in the composite television signal being analyzed. Similarly, when using one of the other sweep modes, the reset A signal is generated by a vertical sync pulse.

When a portion of the waveform to be analyzed is highlighted on the monitor display prior to selection of the expanded display, the length and location in time of the highlighted portion is stored in the microcontroller 16. The number of clock pulses which occur between the corresponding sync pulse and the leading edge of the highlighted portion of the waveform is preloaded into the edge of the highlighted portion of the waveform being analyzed.

The composite C, the exclusive or of the A and B signals from the summer 24 is shown in FIG. 2G and may be seen to be high until the A signal goes low and to remain high until the B signal goes low. Thus, the C signal is low during the duration of the highlighted portion of the waveform being analyzed. As shown in FIG. 2H, the ramp signal generated by the sweep oscillator 26 as the capacitor thereof is charged through the resistor is initiated when the C signal goes low and ends when the C signal goes high.

It will be seen that the length and location in a horizontal line of the portion of the television video signal to be displayed in expanded form is controlled by the length and location of the C signal.

In the disclosed embodiment of this invention, two different clock signals are provided. When the 7.19 Mhz clock pulses are used, a horizontally expanded display of the selected portion of the waveform being analyzed is provided, and when a sweep mode using the 3.58 Mhz clock pulses are used the selected portion of the waveform will be further expanded to approximately twice the width displayed when the 7.19 Mhz clock pulses are used.

The sweep signal generator shown in FIG. 1 can be used to provide four different sweeps depending upon the start counter 20 and the number of clock pulses which occur between the left and right hand edges of the highlighted portion of the waveform is preloaded into the duration counter 22.

When the reset A pulse occurs, the start counter begins to count the clock pulses applied thereto from the gating control device 14 in response to the reset A signal. The output from the start counter 20 is referred herein as the A signal and is shown in FIG. 2D. Signal A remains high until the number of pulses counted by the start counter reaches the preloaded number. In the preferred embodiment, the start counter counts down from the preloaded number and when start counter 20 reaches zero, signal A goes low. At this same time that the start counter 20 has counted down to zero it initiates operation of the duration counter 22 as shown in FIG. 2E.

The number of clock pulses which occur during the highlighted portion of the waveform being analyzed is initially preloaded into the duration counter 22 by the microcontroller 16. The duration counter counts down until the count reaches zero. At this time the B signal as shown in FIG. 2F goes from high to low. It will thus be seen by those skilled in the art that the A signal goes low at the left hand edge of the highlighted portion of the waveform being analyzed and the B signal goes low at the right hand occurrences of the reset A and reset B signals relative to the waveform being monitored and the clock signal selected.

| SWEEP | COUNTER CLOCK | RESET SIGNAL |
| --- | --- | --- |
| 1 horizontal line | 7.19 Mhz | horizontal sync |
| 2 horizontal lines | 3.58 Mhz | horizontal sync/2 |
| 1 field | 1 horizontal line | vertical sync |
| 1 frame | 1 horizontal line | vertical sync/2 |

It will thus be seen that the expanded sweep generator of the present invention provides four expanded sweep modes which thus offers a person analyzing or servicing video equipment a considerable amount of pertinent information. Starting with the first mode where one horizontal line of the video signal is displayed and ending with the fourth mode where two fields are displayed, the degree of resolution is successively reduced but the length of the video signal which is displayed is successively increased.

Let us consider these four modes individually.

1 Horizontal Sweep

In this mode one horizontal line of the video signal is displayed on the screen of the monitor. This display equates to an analog representation of what the operator would see if he could look at just one horizontal line of the video picture on a TV screen. Included with the picture information are the horizontal sync, horizontal blanking and color burst control signals. These control signals are used by TVs and VCRs to synchronize the picture signal with the vertical and horizontal sweeps.

This sweep mode enables the operator to verify and evaluate the timing or control signals as well as the picture information. Some of the more important specifications which the operator may evaluate in this mode are the horizontal sync pulse width, the horizontal sync pulse level, the location and amplitude of the color burst signal, the differential gain, and the luma-chroma delay.

Using the expanded sweep feature of the present invention with this sweep mode allows the user to display in great detail the particular portion of the video signal in which he is most interested.

2 Horizontal Sweep

In this sweep mode two horizontal lines of video information is displayed on the CRT of the monitor. This mode is similar to the one horizontal sweep mode described in detail hereinabove except that two horizontal lines are displayed at one-half the resolution. In addition to the specifications listed above in connection with the one horizontal sweep mode some of the additional observations which can be selected are the color burst phase and the white and black levels.

1 Field Sweep

The 1 Field Sweep displays 512 horizontal lines of video information and the vertical sync and blanking signals. This would equate to an analog representation of what the operator would see if he could observe the TV screen for just 1/60th of a second. This sweep mode provides an excellent troubleshooting or error analysis because one complete screen of information is displayed. For example, if a camera is outputing a blank line of information near the bottom of the picture, the operator would be able to observe that one line is missing and where it is missing. Then by using the expanded sweep feature of the present invention, the operator could evaluate the missing line and identify the problem.

2 Field or 1 Frame Sweep

This sweep mode displays twice the information as does the 1 Field sweep and one-half the resolution. While this mode can be used to provide the same troubleshooting and analysis information as the 1 Field Sweep mode, a key feature of this sweep mode is its inherent ability to enable the evaluation of low frequency noise introduced into the video signal from power supplies and florescent lighting.

While the present invention has been described in connection with a particular embodiment thereof, it will be understood that those skilled in the art may make many changes and modifications therein without departing from the true spirit and scope of the invention. Therefore, it is intended by the appended claims to cover all such changes and modifications which come within the true spirit and scope of the invention.

What is claimed:

1. Apparatus for generating control signals for expanded sweeps in a television waveform monitor, said monitor being used to display portions of a standard television signal including horizontal and vertical sync pulses, comprising in combination clock pulse generating means for producing a train of clock pulses at a predetermined rate, means for synchronizing the occurrence of said clock pulses with the horizontal sync pulses of the waveform being monitored, a preloaded start counter means for counting clock pulses applied thereto between a first reset signal and a first pulse count preloaded therein, and for producing a duration counter start signal when the number of clock pulses counted has reached said first preloaded pulse count, said preloaded start counter means producing said duration counter start signal having a first output level which occurs between said first reset signal and a different second output level, a preloaded duration counter for counting clock pulses applied thereto between the beginning of said second output level of said duration start signal and the time when the number of clock pulses counted thereby has reached a second pulse count preloaded therein, means for applying said duration counter start signal to said duration counter to initiate the counting of said clock pulses by said duration counter, said duration counter producing an output signal having said first output level between the occurrence of said duration counter start signal and the time said preloaded second count in said duration counter is reached, an exclusive or circuit having an output when only one or the other of a pair of predetermined input signal levels is applied to a pair of inputs thereof, for applying the outputs from said start and duration counter means to said exclusive or circuit to produce a sweep control signal starting at the occurrence of the duration start signal and ending at the time the duration counter has counted the number of clock pulses preloaded therein.

2. A method of producing control signals for an expanded sweep in a cathode ray tube type of a television video waveform monitor, comprising the steps of generating a train of clock pulses having a frequency that is a multiple of the horizontal sweep frequency of the waveform being monitored, preloading a first counter with the number of clock pulses which occur between the beginning of a horizontal line and the beginning of a selected portion of the waveform to be displayed on said cathode ray tube, preloading a second counter with the number of clock pulses which occur between the beginning of said selected portion of said waveform and the end of said selected portion of said waveform, initiating the operation of said first counter in synchronism with a sync pulse from said waveform being monitored, initiating the operation of said second counter when said first counter has counted the number of clock pulses which was preloaded therein and terminating the counting of said clock pulses by said first counter, terminating the counting of said clock pulses by said second counter when the number of clock pulses counted by said second counter reaches said number preloaded in second counter, and deriving from said first and second counters a sweep control signal which occurs from the time that said first counter terminates counting and said second counter terminates counting said clock pulses.

3. The method according to claim 2 wherein said sync pulse is a horizontal sync pulse.

4. The method according to claim 2 wherein said sync pulse is a vertical sync pulse.

5. The method according to claim 2 wherein said sweep control signal is a sawtooth wave.

6. The method according to claim 2 wherein said sweep signal is derived from said outputs of said counters using an exclusive or circuit.

7. A method of producing control signals for an expanded sweep in a cathode ray tube type of a television video waveform monitor, comprising the steps of generating a train of clock pulses at a frequency which is a multiple of the horizontal sweep frequency of a television waveform to be monitored, selecting a portion of the television waveform to be displayed, preloading into a first pulse counter the number of clock pulses which occur between a sync pulse of said waveform and the left edge of the selected portion to be displayed, preloading into a second pulse counter the number of clock pulses which occur between the left and right edges of said selected portion of said television waveform, producing a first control signal when the number of clock pulses counted by said first counter reaches said number preloaded into said first counter, initiating counting by said second pulse counter when said first control is produced, and producing a second control signal when the number of clock pulses counted by said second counter reaches said number preloaded into said second counter, whereby, said first and second control signals occur respectively at the left and right edges of the selected portion of said selected portion of said television waveform.

* * * * *

UNITED STATES PATENT AND TRADEMARK OFFICE
CERTIFICATE OF CORRECTION

PATENT NO. : 5,502,511
DATED : March 26, 1996
INVENTOR(S) : Scott Nagel

It is certified that error appears in the above-identified patent and that said Letters Patent is hereby corrected as shown below:

In column 6, line 58, after "control" insert -- signal --.

In column 6, line 64, after "portion" first occurrence, delete "of said selected portion".

Signed and Sealed this

Thirtieth Day of July, 1996

Attest:

BRUCE LEHMAN

*Attesting Officer*    *Commissioner of Patents and Trademarks*